(12) United States Patent
Takeuchi et al.

(10) Patent No.: US 7,199,914 B2
(45) Date of Patent: Apr. 3, 2007

(54) SCANNING APPARATUS

(75) Inventors: Yukihiro Takeuchi, Nishikamo-gun (JP); Nobuaki Kawahara, Nisshin (JP); Takahiko Yoshida, Okazaki (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/311,181

(22) Filed: Dec. 20, 2005

(65) Prior Publication Data

US 2006/0158713 A1    Jul. 20, 2006

(30) Foreign Application Priority Data

Jan. 19, 2005   (JP) .............................. 2005-011464

(51) Int. Cl.
*G02B 26/08* (2006.01)
(52) U.S. Cl. ...................................... 359/224
(58) Field of Classification Search ................ 359/204, 359/205, 196–199, 206–226; 347/233, 241, 347/243, 251–261
See application file for complete search history.

(56) References Cited

U.S. PATENT DOCUMENTS

2003/0179427 A1 * 9/2003 Lewis et al. ................ 359/204
2004/0017599 A1 * 1/2004 Yang ........................... 359/223

FOREIGN PATENT DOCUMENTS

| JP | A-10-239600 | 9/1998 |
| JP | A-2002-71808 | 3/2002 |
| JP | A-2003-302586 | 10/2003 |
| JP | A-2004-212129 | 7/2004 |

* cited by examiner

*Primary Examiner*—Euncha P. Cherry
(74) *Attorney, Agent, or Firm*—Posz Law Group, PLC

(57) ABSTRACT

A scanning apparatus includes a mirror coupled to a base via a spring portion, and a light source for emitting a beam toward a reflecting surface of the mirror so that the beam is incident thereon. The mirror reflects the beam from the light source and rotationally swings under a resilient force of the spring portion when a force is applied thereto. The reflecting surface of the mirror includes a plurality of mirror surfaces at different angles. The beam from the light source is simultaneously reflected by the mirror surfaces at different angles.

9 Claims, 5 Drawing Sheets

SCANNING APPARATUS

CROSS REFERENCE TO RELATED APPLICATIONS

This application is based on and incorporates herein by reference Japanese Patent Application No. 2005-11464 filed on Jan. 19, 2005.

FIELD OF THE INVENTION

The present invention relates to an MEMS (Micro-Electro-Mechanical System) scanning apparatus for use in a laser radar or the like.

BACKGROUND OF THE INVENTION

An MEMS (Micro-Electro-Mechanical System) scanning apparatus is formed by processing a substrate made of silicon or the like by using a semiconductor process. The MEMS scanning apparatus is typically composed of a mirror coupled to a base via a spring portion, and a light source for emitting a beam toward the reflecting surface of the mirror (see, e.g., Patent Document 1).

In such an MEMS scanning apparatus, the mirror reflects the beam from the light source, while it is driven by the resilient force of the spring portion when a force is applied thereto.

Specifically, the mirror is designed to swing rotationally or linearly under the effect of the resilient force of the spring portion. As a result, a reflected beam from the mirror performs a scanning operation in accordance with the movable range of the mirror thus swinging.

Patent Document 1: JP-2003-302586A

Although an MEMS scanning apparatus as described above is simple in structure and small in size, it is of a swing type using the resilient force of the spring portion so that the scan angle of the mirror, i.e., the swing angle thereof is small.

FIG. 9 is a view showing a schematic cross-sectional structure of a typical prior-art MEMS scanning apparatus. As shown by the arrow Y1 in FIG. 9, a mirror 10 rotationally swings when a force such as an electrostatic force is applied thereto.

At this time, a beam LB from a light source 50 is caused to perform a scanning operation by rotationally swinging the mirror 10. To increase the angle θ2 of the range scanned by the reflected beam LB, i.e., the scan angle θ2 of the beam, the swing angle of the mirror 10 should be increased.

To increase the swing angle of the mirror 10, however, a high-voltage circuit for generating a larger force such as a larger electrostatic force becomes necessary. When the mirror 10 is caused to swing greatly, the mirror 10 interferes with a structure located thereunder, such as a support substrate, so that the swing angle of the mirror 10 is restricted disadvantageously.

Thus, the rotationally swinging type of the MEMS scanning apparatus has such problems as the need of the high-voltage circuit and the restricted swing angle resulting from the interference of the mirror with the adjacent structure. Furthermore, a linearly swinging type of the MEMS scanning apparatus also has the similar problems.

SUMMARY OF THE INVENTION

The present invention has been achieved in view of the foregoing problems and it is therefore an object of the present invention to enlarge the scanning range of a beam from a mirror without increasing the swing angle of the mirror in an MEMS scanning apparatus.

To achieve the object, in an inventive example, a scanning apparatus comprises a mirror coupled to a base via a spring portion, and a light source for emitting a beam toward a reflecting surface of the mirror such that the beam is incident thereon. Here, the mirror reflects the beam from the light source and rotationally swings under a resilient force of the spring portion when a force is applied thereto. The reflecting surface of the mirror is composed of multiple mirror surfaces at different angles, and the beam from the light source is simultaneously reflected by the mirror surfaces at different angles.

In the prior art, the reflecting surface of the mirror includes the single flat surface. In contrast, in the present invention, the reflecting surface of the mirror includes the multiple mirror surfaces at different angles. Since the beam from the light source is simultaneously reflected by the mirror surfaces at different angles, even the single light source allows the scanning range of the beam to be enlarged by a magnitude corresponding to twice the offset between the angles of the mirror surfaces at different angles.

Therefore, this inventive example allows the scanning range of the beam from the mirror to be enlarged without increasing the swing angle of the mirror in an MEMS scanning apparatus.

In the scanning apparatus described above, when the beam is emitted from the light source to be incident on a boundary portion between the mirror surfaces at different angles, it becomes possible to properly implement the simultaneous reflection of the beam from the light source by the mirror surfaces at different angles.

In the scanning apparatus described above, an axis of rotation of the mirror is positioned on the boundary portion between the mirror surfaces at different angles of the reflecting surface of the mirror.

When the beam is emitted from the light source to be incident on the boundary portion between the mirror surfaces at different angles, the power of the single beam is divided into two parts for the respective mirror surfaces with the boundary portion interposed therebetween.

When the axis of rotation of the mirror is positioned not at the boundary portion between the mirror surfaces at different angles of the reflecting surface of the mirror but, e.g., at a location within the mirror to be more on the inner side than the reflecting surface of the mirror, the relative positions of the boundary portion and the beam shift from each other with the rotation of the mirror. As a result, the two parts of the power of the divided beam also vary from each other.

However, by positioning the axis of rotation of the mirror at the boundary portion between the mirror surfaces at different angles of the reflecting surface of the mirror as in this inventive example, the positional shift of the boundary portion and the beam resulting from the rotation of the mirror can be suppressed. The arrangement is preferred since it can prevent the variation of the two parts of the power of the divided beam.

In the scanning apparatus described above, a pattern formed by the mirror surfaces at different angles is repeated over the reflecting surface of the mirror.

This allows the repetitive pattern of the mirror surfaces at different angles to be positioned in the range of the reflecting surface of the mirror which is covered by the single beam. As a result, the beam can be simultaneously reflected by the mirror surfaces at different angles and the required positional accuracy of the beam can be reduced.

In the scanning apparatus described above, the angle θ1 formed between the adjacent two of the mirror surfaces at different angles is half the scan angle θ2 of the beam from each of the mirror surfaces.

The arrangement allows the adjacent two mirror surfaces to provide the scanning ranges which have no gap and no overlapping portion therebetween. As a result, the scanning range of the beam can be enlarged efficiently.

In another inventive example, a scanning apparatus comprises a mirror coupled to a base via a spring portion and a plurality of light sources, each of which is for emitting a beam toward a reflecting surface of the mirror. Here, the mirror reflects the beam from the each of the light sources and rotationally swings under a resilient force of the spring portion when a force is applied thereto. The reflecting surface of the mirror includes a plurality of mirror surfaces at different angles, and the individual beams emitted from the light sources are incident on the individual mirror surfaces at different angles.

In this inventive example, the reflecting surface of the mirror is composed of the multiple mirror surfaces at different angles. Since the multiple light sources are provided to emit the different beams toward the individual mirror surfaces at different angles such that the beams are incident thereon, the scanning range of the beams can be enlarged by a magnitude corresponding to twice the offset between the angles of the mirror surfaces at different angles.

Therefore, this inventive example allows the scanning range of the beams from the mirror to be enlarged without increasing the swing angle of the mirror in the MEMS scanning apparatus.

In the scanning apparatus described above, the beams may be emitted to be simultaneously incident on the individual mirror surfaces at different angles.

Alternatively, in the scanning apparatus described above, the beams may not be emitted to be simultaneously incident on the individual mirror surfaces at different angles.

In the scanning apparatus described above, the angle θ1 formed between the adjacent two of the mirror surfaces at different angles is half the scan angle θ2 of each of the beams from the mirror surfaces.

The arrangement allows the adjacent two mirror surfaces to provide the scanning ranges of the beams which have no gap and no overlapping portion therebetween. As a result, the scanning range of the beams can be enlarged efficiently.

In still another inventive example, a scanning apparatus comprises a mirror coupled to a base via a spring portion and a plurality of light sources for emitting individual beams to be incident at different angles on a reflecting surface of the mirror. Here, the mirror reflects the beams from the light sources and rotationally swings under a resilient force of the spring portion when a force is applied thereto.

In this inventive example, the multiple light sources are provided to emit the multiple beams toward the reflecting surface of the mirror such that the beams are incident at different angles thereon. Accordingly, even when the reflecting surface of the mirror is composed of a single flat surface as in the prior art, the scanning range of the beams can be enlarged by a magnitude corresponding to the offset between the angles of the beams at different angles of incidence.

Therefore, this inventive example allows the scanning range of the beams from the mirror to be enlarged without increasing the swing angle of the mirror in the MEMS scanning apparatus.

In this scanning apparatus, two beams at different angles of incidence are present and the angle θ3 formed between the two beams is the same as the scan angle θ2 of each of the beams from the reflecting surface of the mirror.

The arrangement allows the two beams to provide the scanning ranges which have no gap and no overlapping portion therebetween. As a result, the scanning range of the beams can be enlarged efficiently.

In yet another inventive example, a scanning apparatus comprises a mirror coupled to a base via a spring portion, and a light source for emitting a beam toward a reflecting surface of the mirror, wherein the mirror reflects the beam from the light source and linearly swings under a resilient force of the spring portion when a force is applied thereto and the reflecting surface of the mirror is composed of multiple mirror surfaces at different angles.

In this inventive example, the reflecting surface of the mirror is composed of the multiple mirror surfaces at different angles. As a result, the scanning range of the beam can be enlarged by a magnitude corresponding to twice the offset between the angles of the mirror surfaces at different angles of the linearly swinging mirror.

Therefore, this inventive example allows the scanning range of the beam from the mirror to be enlarged without increasing the swing angle of the mirror in the MEMS scanning apparatus.

In this scanning apparatus, the reflecting surface of the mirror can have a concave or convex configuration.

In this scanning apparatus, the reflecting surface of the mirror can have multiple mirror surfaces at different angles formed in a stepwise configuration.

Alternatively, in the scanning apparatus described above, the reflecting surface of the mirror can also have the multiple mirror surfaces at different angles formed continuously.

Alternatively, in the scanning apparatus described above, multiple beams are reflected simultaneously from the mirror and a light receiving portion is provided to receive multiple reflected beams generated when the multiple reflected beams impinge on an external object and are reflected by the external object. The light receiving portion are divided into parts corresponding to the respective positions of the beams reflected by the external object such that the directions of incidence of the reflected beams that are received are determined based on the positions at which the reflected beams were received in the receiving portion.

When the multiple beams are thus reflected or emitted simultaneously from the mirror and the light receiving portion is thus provided to receive the multiple reflected beams generated when the multiple emitted beams impinge on the external object and are reflected thereby, the multiple reflected beams can be identified individually by forming the light receiving portion having the divided configuration.

This allows the provision of a scanning apparatus suitable for use in a distance meter for measuring a distance from an external object or a laser radar.

In the scanning apparatus described above, the force applied to the mirror to cause the mirror to swing under the resilient force of the spring portion is an electrostatic force.

BRIEF DESCRIPTION OF THE DRAWINGS

The above and other objects, features, and advantages of the present invention will become more apparent from the following detailed description made with reference to the accompanying drawings.

In the drawings.

DETAILED DESCRIPTION OF THE PREFERRED EMBODIMENT

Figure 1:
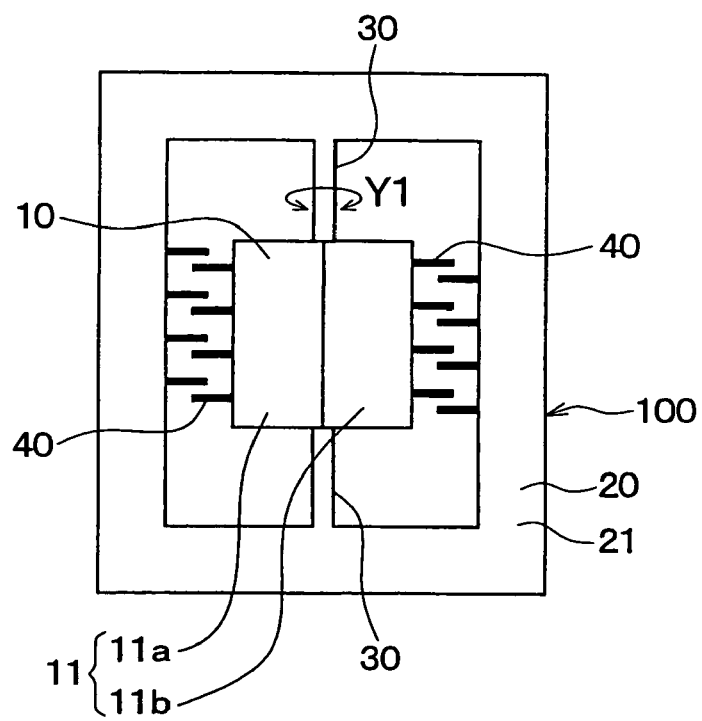
FIG. 1 is a schematic plan view showing the principal portion of an MEMS scanning apparatus according to a first embodiment of the present invention.

Referring to the drawings, the embodiment of the present invention will be described herein below. Throughout the drawings in the individual embodiments which will be described below, like or equal parts are designated by like reference numerals for clarity of description.

First Embodiment

Figure 2:
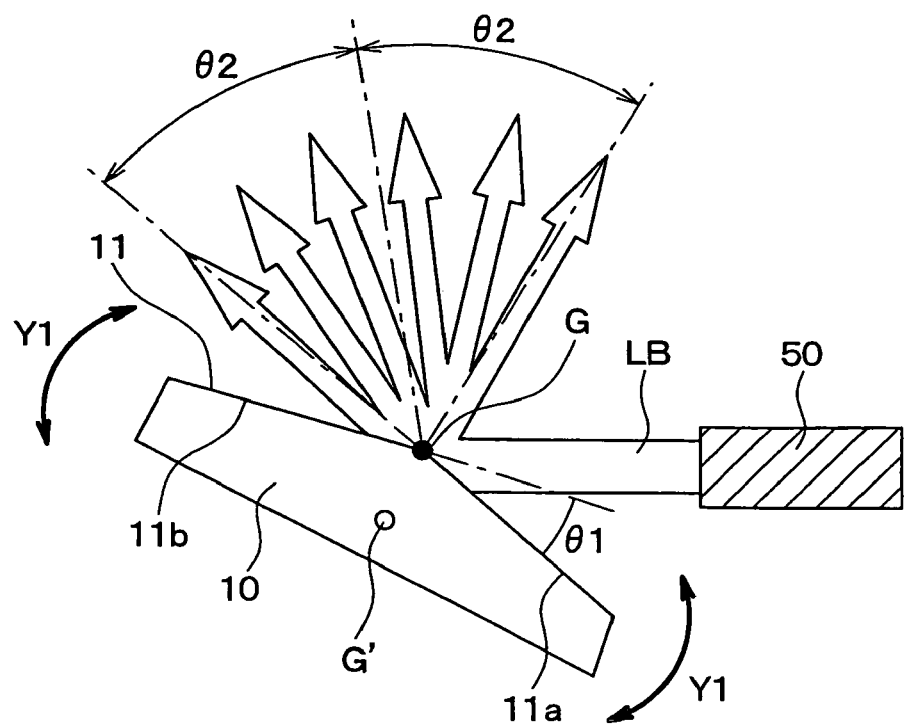
FIG. 2 is a schematic cross-sectional view showing the principal portion of the scanning apparatus shown in FIG. 1.

FIG. 1 is a schematic plan view showing the principal portion of an MEMS scanning apparatus according to a first embodiment of the present invention. FIG. 2 is a schematic cross-sectional view showing the principal portion of the scanning apparatus according to the present embodiment.

FIG. 1 shows a plan structure of a mirror device having a mirror 10 in the scanning apparatus according to the present embodiment when viewed from the side with a reflecting surface 11 of the mirror 10. The mirror device is fabricated by processing a semiconductor substrate 100 made of silicon or the like by using semiconductor fabrication technologies such as photolithography and etching.

In the present embodiment, the semiconductor substrate 100 is composed of a SOI (Silicon-On-Insulator) substrate 100 constituted by two silicon layers and an oxide layer interposed therebetween. FIG. 1 shows the surface of one of the silicon layers of the SOI substrate 100.

By performing trench etching with respect to the one of the silicon layers of the SOI substrate 100, structures 10 to 40 as shown in FIG. 1 are formed. The mirror 10 is located at the center portion of the SOI substrate 100 shown in FIG. 1. In the present embodiment, the mirror 10 is configured as a rectangular plate.

The mirror 10 is coupled to a base 20 via beam portions 30 each as a spring portion. The base 20 has a rectangular frame 21 located around the mirror 10. The frame 21 is supported, e.g., relative to the other silicon layer of the SOI substrate 100 via the oxide layer. The base 20 is composed of the frame 20 including a supporting portion therefor.

In the inner peripheral portion of the frame 21, the oxide layer located under one of the silicon layers has been removed by sacrificial layer etching or the like. Consequently, the structure composed of one of the silicon layers located in the inner peripheral portion of the frame 21 is in a state apart from the other silicon layer located therebelow.

The mirror 10 has both ends of one pair coupled to the frame 21 via the beam portions 30 and is supported by the frame 21. In the present embodiment, the beam portions 30 implement the rotationally swinging mirror 10. By the resilient force of the beam portions 30, the mirror 10 is allowed to rotationally swing in the direction indicated by the arrow Y1 in FIG. 1.

The both ends of the other pair of the mirror 10 are provided with a drive electrode 40 for driving the mirror 10, i.e., applying an electrostatic force as a force for causing the mirror 10 to rotationally swing. In the present embodiment, the drive electrode 40 is composed of (i) a comb-tooth portion formed to protrude from the mirror 10 toward the frame 21 and (ii) a comb-tooth portion formed to protrude from the frame 21 toward the mirror 10.

The drive electrode 40 applies a voltage between the comb-tooth portion of the mirror 10 and that of the frame 21 and thereby generates the electrostatic force between the two comb-tooth portions. By the application of the electrostatic force, the mirror 10 is caused to rotationally swing in the direction indicated by the arrow Y1 in FIG. 1 under the effect of the resilient force of the beam portions 30.

As shown in FIG. 2, the scanning apparatus according to the present embodiment comprises a light source 50 for emitting a beam LB toward the reflecting surface 11 of the mirror 10. The light source 50 is composed of a semiconductor laser diode. The light source 50 is located above the plane of a paper sheet with FIG. 1 printed thereon to allow the beam LB to be incident on the reflecting surface 11 of the mirror 10, though it is not depicted in FIG. 1.

As shown in FIG. 2, the beam LB is emitted from the light source 50 to be incident on the reflecting surface 11 of the mirror 10 and reflected by the mirror 10 rotationally swinging in the direction indicated by the arrow Y1 in FIG. 2 to perform a scanning operation.

A description will be given next to a structure peculiar to the scanning apparatus according to the present embodiment.

As described above, the scanning apparatus according to the present embodiment comprises the mirror 10 coupled to the base 20 via the beam portions 30 each as the spring portion and the light source 50 for emitting the beam LB toward the reflecting surface 11 of the mirror 10 such that the beam LB is incident thereon. The mirror 10 is basically designed to reflect the beam LB from the light source 50 and rotationally swing under the resilient force of the spring portion 30 when an electrostatic force is applied thereto, i.e., designed as an MEMS and rotationally swinging type.

Such a scanning apparatus has the structure peculiar to the present embodiment in which the reflecting surface 11 of the mirror 10 is comprised of multiple mirror surfaces 11a and 11b at different angles, as shown in FIGS. 1 and 2.

In FIG. 2, the reflecting surface 1 has a bent configuration such that the two mirror surfaces 11a and 11b are formed on both sides of a boundary portion composed of the ridge of a protruding portion as a bent portion. It is assumed herein that the right-side mirror surface 11a in FIG. 2 is a first mirror surface 11a and the left-side mirror surface 11b in FIG. 2 is a second mirror surface 11b. It is also assumed that the angle formed between the adjacent two mirror surfaces 11a and 11b is θ1.

These two mirror surfaces 11a and 11b constitute the reflecting surface 11 of the mirror 10. Such a reflecting surface 11 can be formed by etching, cutting, and the like.

The beam LB from the light source 50 is simultaneously reflected by the mirror surfaces 11a and 11b at different angles. Specifically, as shown in FIG. 2, the beam LB is emitted from the light source 50 to be incident on the boundary portion between the mirror surfaces 11a and 11b at different angles to be reflected by each of the mirror surfaces 11a and 11b.

At this time, since the mirror 10 rotationally swings in the direction indicated by the arrow Y1 in FIG. 2, the beam LB reflected by each of the mirror surfaces 11a and 11b performs a scanning operation in accordance with the swing angle of the mirror 10. Specifically, when the swing angle of the mirror 10 is θ2/2, the beam LB from each of the mirror surfaces 11a and 11b has a scan angle θ2.

In FIG. 2, the scan angle θ2 of the beam shown on the right-hand side of the drawing is the scan angle θ2 of the beam from the right-side first mirror surface 11a and the scan angle θ2 of the beam shown on the left-hand side of the drawing is the scan angle θ2 of the beam from the left-side second mirror surface 11b.

As a preferred example, FIG. 2 shows the case where the angle θ1 formed between the adjacent two mirror surfaces 11a and 11b is half the scan angle θ2 of the beam from each of the mirror surfaces 11a and 11b. Specifically, settings can be made to satisfy θ1=θ2/2=about 10°.

In this case, even when the swing angle of the mirror 10 is θ2/2, the total scan angle of the beam LB from the mirror 10 has a value 2×θ2 which is the sum of the scan angle θ2 of the beam from the first mirror surface 11a and the scan angle θ2 of the beam from the second mirror surface 11b. Accordingly, in the present embodiment, the total scan angle of the beam LB can be increased to about four times the swing angle of the mirror 10.

It will easily be understood that the angle θ1 formed between the two mirror surfaces 11a and 11b and the scan angle θ2 of the beam from each of the mirror surfaces 11a and 11b may be different from each other. The angle θ1 may be larger or smaller than half the scan angle θ2. In that case also, it is obvious from the foregoing description that the scan angle of the beam LB can be set larger than twice the swing angle of the mirror 10.

Thus, according to the present embodiment, the scanning apparatus of the MEMS and rotationally swinging type can be provided which is characterized in that the reflecting surface 11 of the mirror 10 is comprised of the multiple mirror surfaces 11a and 11b at different angles and the beam LB from the light source 50 is simultaneously reflected by the mirror surfaces 11a and 11b at different angles.

In the prior art, the reflecting surface of the mirror is composed of the single flat surface. By contrast, the present embodiment has composed the reflecting surface 11 of the mirror 10 of the multiple mirror surfaces 11a and 11b at different angles.

Since the beam LB from the light source 50 is simultaneously reflected by the mirror surfaces 11a and 11b at different angles, even the single light source 50 allows the scanning range of the beam LB from the mirror 10 to be enlarged by a magnitude corresponding to twice the offset between the angles of the mirror surfaces 11a and 11b at different angles, i.e., by twice the angle θ1 mentioned above.

Therefore, the present embodiment allows the scanning range of the beam LB from the mirror 10 to be enlarged without increasing the swing angle of the mirror 10 in the MEMS scanning apparatus.

One of the characteristic features of the present embodiment is that the beam LB from the light source 50 is incident on the boundary portion between the mirror surfaces 11a and 11 at different angles, as described above. The arrangement properly implements the simultaneous reflection of the beam LB from the light source 50 by the mirror surfaces 11a and 11b at different angles.

In the present embodiment, the axis G (the solid circle G in FIG. 2) of rotation of the mirror 10 when the mirror 10 rotationally swings is preferably positioned at the boundary portion between the mirror surfaces 11a and 11b at different angles of the reflecting surface 11 of the mirror 10, as shown in FIG. 2. It will easily be understood that the arrangement does not limit the position of the axis G of rotation.

As shown in FIG. 2, when the beam LB is emitted from the light source 50 to be incident on the boundary portion between the mirror surfaces 11a and 11b at different angles, the power of the single beam LB is divided into two parts for the respective mirror surfaces 11a and 11b with the boundary portion interposed therebetween.

When the axis G of rotation of the mirror 10 is positioned not at the boundary portion between the mirror surfaces 11a and 11b at different angles of the reflecting surface 11 of the mirror 10 but at a location within the mirror 10 to be more on the inner side than the reflecting surface 11 of the mirror 10 as shown by the hollow circle G' in FIG. 2, e.g., the relative positions of the boundary portion and the beam LB shift from each other with the rotation of the mirror 10. As a result, the two parts of the power of the divided beam LB for the respective mirror surfaces 11a and 11b also vary from each other with the rotation of the mirror 10.

However, by positioning the axis G of rotation of the mirror 10 at the boundary portion between the mirror surfaces 11a and 11b at different angles of the reflecting surface 11 of the mirror 10 as in the example shown in FIG. 2, the positional shift of the boundary portion and the beam LB resulting from the rotation of the mirror 10 can be suppressed. The arrangement is preferred since it can prevent the variation of the two parts of the power of the divided beam LB.

As described above, it is preferred in the present embodiment that the angle θ1 formed between the adjacent two mirror surfaces 11a and 11b at different angles is half the scan angle θ2 of the beam from each of the mirror surfaces 11a and 11b, as in the example shown in FIG. 2.

The arrangement allows the adjacent two mirror surfaces 11a and 11b to provide the scanning range of the beam LB with no gap and no overlapping portion. As a result, the scanning range of the beam LB from the mirror 10 can be enlarged efficiently.

When θ1=θ2/2=10° is assumedly satisfied, the scan angle θ2 of the beam reflected from the first mirror surface 11a and the scan angle θ2 of the beam reflected from the second mirror surface 11b have no overlapping portion and no gap therebetween. Accordingly, the scan angle of the beam LB becomes 2×θ2, as described above.

Variation

Figure 3:
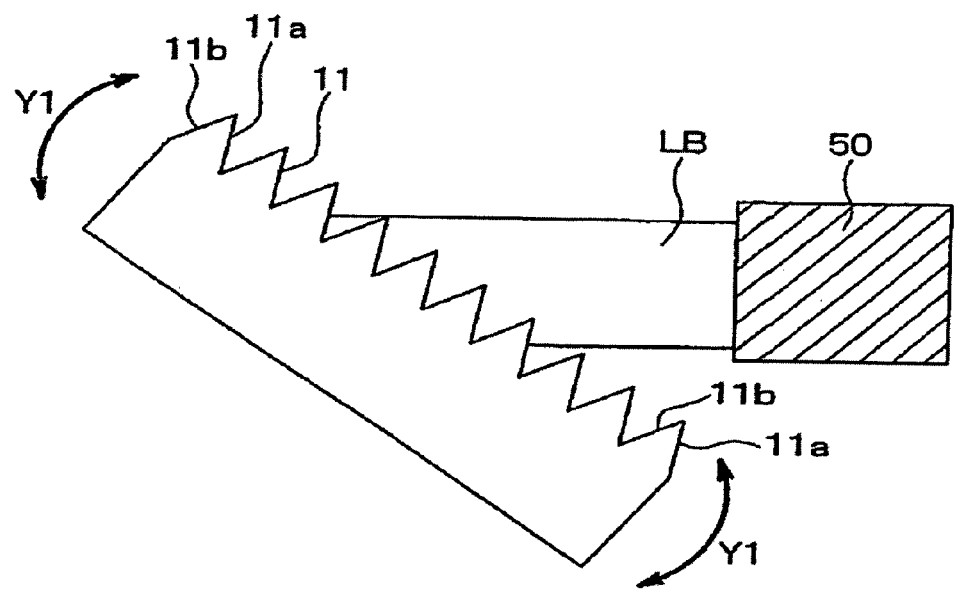
FIG. 3 is a schematic cross-sectional view showing a variation of the first embodiment.

FIG. 3 is a schematic cross-sectional view illustrating a variation of the present embodiment. As shown in FIG. 3, a pattern formed by the mirror surfaces 11a and 11b at different angles is repeated over the reflecting surface 11 of the mirror 10.

Thus, in the mirror 10 according to the present variation, the reflecting surface 11 of the mirror 10 is composed of the numerous mirror surfaces 11a and 11b at different angles. In FIG. 3, ten first mirror surfaces 11a and ten second mirror surfaces 11b are provided. Such a reflecting surface 11 can also be formed by etching, cutting, and the like.

According to the present variation, the repetitive pattern of the mirror surfaces 11a and 11b at different angles can be positioned within the range of the reflecting surface 11 of the mirror 10 which is covered by the single beam LB.

In the foregoing example shown in FIG. 2, the beam LB from the light source 50 is incident on the boundary portion between the mirror surfaces 11a and 11b at different angles to be simultaneously reflected thereby. However, the arrangement consequently increases the required positional accuracy of the beam LB.

By contrast, the present variation reduces the required positional accuracy of the beam LB to cause the simultaneous reflection of the beam LB by the mirror surfaces 11a and 11b at different angles.

Second Embodiment

Figure 4:
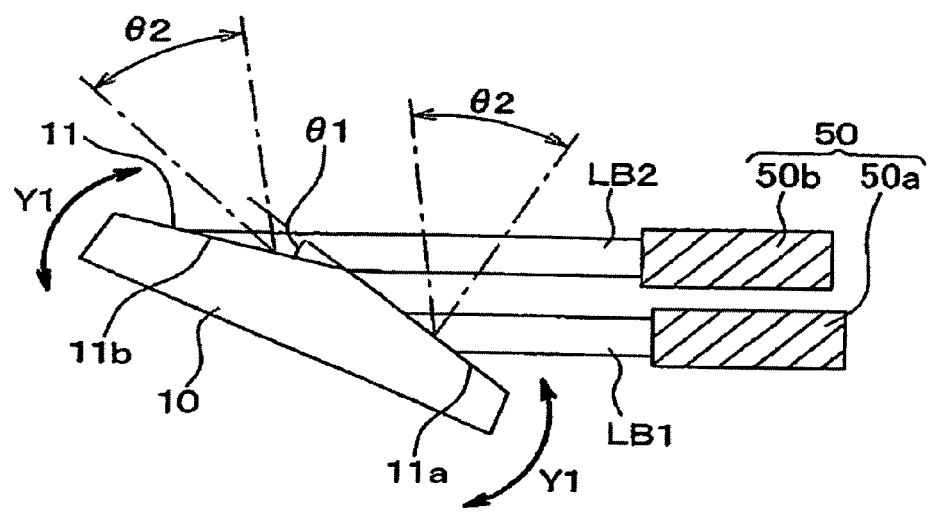
FIG. 4 is a schematic cross-sectional view showing the principal portion of an MEMS scanning apparatus according to a second embodiment of the present invention.

FIG. 4 is a schematic cross-sectional view showing the principal portion of an MEMS scanning apparatus according to a second embodiment of the present invention.

The scanning apparatus according to the present embodiment also comprises the mirror 10 (see FIG. 1) coupled to the base 20 via the beam portions 30 each as the spring portion and the light source 50 for emitting the beam LB toward the reflecting surface 11 of the mirror 10, in the same manner as in the first embodiment. The mirror 10 is basically designed to reflect the beam LB from the light source 50 and rotationally swing under the resilient force of the spring portion 30 when an electrostatic force is applied thereto, i.e., designed as the MEMS and rotationally swinging type.

As also shown in FIG. 4, the scanning apparatus according to the present embodiment also has the mirror 10 of which the reflecting surface 11 is comprised of the multiple mirror surfaces 11a and 11b at different angles, in the same manner as in the first embodiment.

In contrast to the embodiment described above in which the single light source 50 is provided, the multiple light sources 50 are provided in the present embodiment. In the example shown in FIG. 4, two light sources 50 are provided to correspond to the two mirror surfaces 11a and 11b at different angles. In FIG. 4, a lower light source 50a is assumed to be a first light source 50a and an upper light source 50b is assumed to be a second light source 50b.

As shown in FIG. 4, different beams LB1 and LB2 parallel to each other are emitted from the multiple light sources (50a and 50b) to be incident on the mirror surfaces 11a and 11b at different angles, respectively.

In FIG. 4, the beam LB1 is emitted from the lower first light source 50a to be incident on the first mirror surface 11a located on the right-hand side of the reflecting surface 11 of the mirror 10, while the beam LB2 is emitted from the upper second light source 50b to be incident on the second mirror surface 11b located on the left-hand side of the reflecting surface 11 of the mirror 10. The beams LB1 and LB2 are reflected by the mirror surfaces 11a and 11b, respectively.

At this time, since the mirror 10 rotationally swings in the direction indicated by the arrow Y1 in FIG. 4, the beams LB1 and LB2 reflected by the respective mirror surfaces 11a and 11b perform scanning operations in accordance with the swing angle of the mirror 10.

In FIG. 4, the scan angle $\theta2$ of the beam shown on the right-hand side of the drawing is the scan angle $\theta2$ of the beam from the first mirror surface 11a which reflects the beam LB1 from the first light source 50a, whereas the scan angle $\theta2$ of the beam shown on the left-hand side of the drawing is the scan angle $\theta2$ of the beam from the second mirror surface 11b which reflects the beam LB2 from the second light source 50b.

As a preferred example, FIG. 4 shows the case where the angle $\theta1$ formed between the adjacent two mirror surfaces 11a and 11b is half the scan angle $\theta2$ of each of the beams from the individual mirror surfaces 11a and 11b.

In this case, when the swing angle of the mirror 10 is, e.g., $\theta2/2$, the total scan angle of the beams LB1 and LB2 from the mirror 10 has a value $2\times\theta2$ which is the sum of the respective scan angles $\theta2$ of the individual beams from the two mirror surfaces 11a and 11b, in the same manner as described above with reference to FIG. 2. Accordingly, the total scan angle of the beams LB1 and LB2 can be increased to about four times the swing angle of the mirror 10.

In this case also, it will easily be understood that the angle $\theta1$ formed between the two mirror surfaces 11a and 11b may be different from the scan angle $\theta2$ of each of the beams from the individual mirror surfaces 11a and 11b. In that case also, it is obvious from the foregoing description that the scan angle of the beams can be increased to be larger than twice the swing angle of the mirror 10.

Thus, in the present embodiment, the reflecting surface 11 of the mirror 10 is composed of the multiple mirror surfaces 11a and 11b at different angles. In addition, the light source 50 is composed of the multiple light sources 50a and 50b such that the different beams LB1 and LB2 are emitted from the multiple light sources 50a and 50b to be incident on the individual mirror surfaces 11a and 11b at different angles.

As a result, the scanning range of the beams from the mirror 10 can also be enlarged in the present embodiment by a magnitude corresponding to twice the offset between the angles of the mirror surfaces 11a and 11b at different angles, i.e., by twice the angle $\theta1$ mentioned above.

Therefore, the present embodiment allows the scanning range of the beams from the mirror 10 to be enlarged without increasing the swing angle of the mirror 10 in the MEMS scanning apparatus.

In the present embodiment, the beams LB1 and LB2 may be emitted to be incident on the mirror surfaces 11a and 11b at different angles either simultaneously or non-simultaneously at different times.

As described above, also in the present embodiment, the angle $\theta1$ formed between the adjacent two mirror surfaces 11a and 11b is preferably half the scan angle $\theta2$ of each of the beams from the mirror surfaces 11a and 11b as in the example shown in FIG. 4. The reason for this is the same as in the embodiment described above.

In the present embodiment, each of the number of the light sources and the number of the mirror surfaces at different angles may also be 3 or more provided that different beams parallel to each other are emitted from the multiple light sources to be incident on the individual mirror surfaces at different angles.

Third Embodiment

Figure 5:
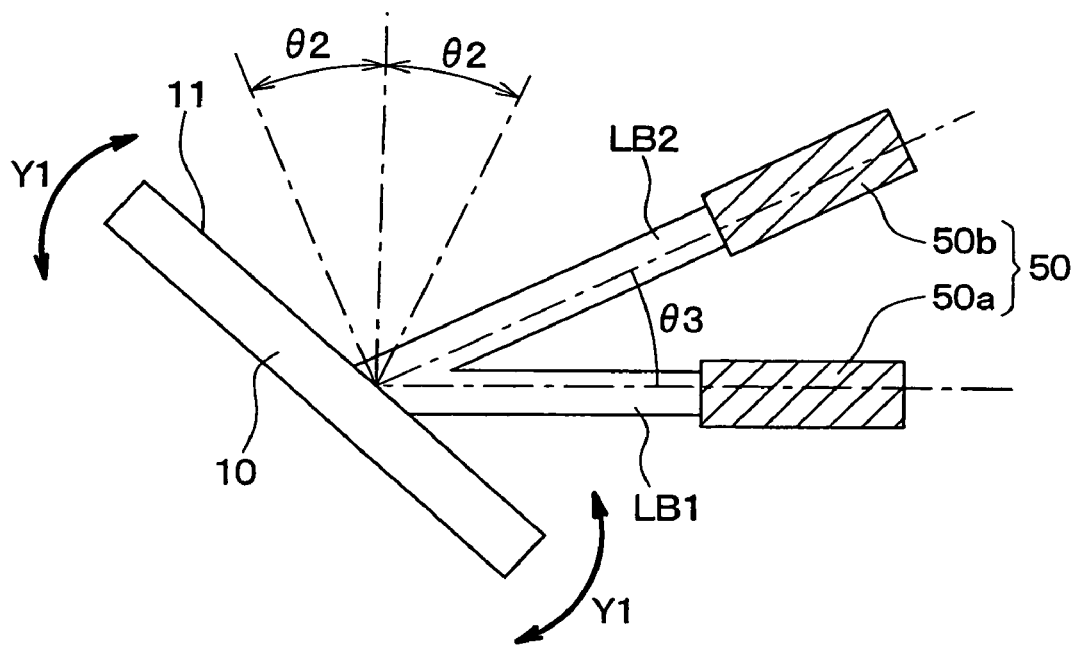
FIG. 5 is a schematic cross-sectional view showing the principal portion of an MEMS scanning apparatus according to a third embodiment of the present invention.

FIG. 5 is a schematic cross-sectional view showing the principal portion of an MEMS scanning apparatus according to a third embodiment of the present invention.

The scanning apparatus according to the present embodiment also comprises the mirror 10 (see FIG. 1) coupled to the base 20 via the beam portions 30 each as the spring portion and the light source 50 for emitting the beam LB toward the reflecting surface 11 of the mirror 10, in the same manner as in the first embodiment. The mirror 10 is basically designed to reflect the beam LB from the light source 50 and rotationally swing under the resilient force of the spring portion 30 when an electrostatic force is applied thereto, i.e., designed as the MEMS and rotationally swinging type.

As shown in FIG. 5, the present embodiment is characterized in the following: multiple light sources 50 (50a and 50b) are provided to emit multiple beams LB1 and LB2 to be incident at different angles on the reflecting surface 11 of the mirror 10, respectively.

In the example shown in FIG. 5, two light sources 50 are provided. In the drawing, the lower light source 50a is assumed to be the first light source 50a and the upper light source 50b is assumed to be the second light source 50b. The reflecting surface 11 of the mirror 10 is a single flat mirror surface in the same manner as in the prior art.

The beam LB1 is emitted from the lower first light source 50a to be incident on the reflecting surface 11 of the mirror 10, while the beam LB2 is emitted from the upper second light source 50b to be incident at an angle different from that of the beam LB1 on the reflecting surface 11 of the mirror 10. Each of the beams LB1 and LB2 is reflected by the reflecting surface 11.

At this time, since the mirror 10 rotationally swings in the direction indicated by the arrow Y1 in FIG. 5, each of the beams LB1 and LB2 reflected by the reflecting surface 11 performs a scanning operation in accordance with the swing angle of the mirror 10. It is assumed herein that the two beams LB1 and LB2 at different angles of incidence are present and the angle formed between the two beams LB1 and LB2 is $\theta 3$.

In FIG. 5, the scan angle $\theta 2$ of the beam shown on the left-hand side of the drawing is the scan angle $\theta 2$ of the beam from the reflecting surface 11 which reflects the beam LB1 from the first light source 50a, whereas the scan angle $\theta 2$ of the beam shown on the right-hand side of the drawing is the scan angle $\theta 2$ of the beam from the reflecting surface 11 which reflects the beam LB2 from the second light source 50b.

As a preferred example, FIG. 5 shows the case where the angle $\theta 3$ formed between the two beams LB1 and LB2 is the same as the scan angle $\theta 2$ of each of the beams from the reflecting surface 11 of the mirror 10.

In this case, when the swing angle of the mirror 10 is $\theta 2/2$, the total scan angle of the beams from the mirror 10 has a value $2 \times \theta 2$ which is the sum of the scan angle $\theta 2$ of each of the two beams LB1 and LB2. Accordingly, the total scan angle of the beams LB1 and LB2 can be increased to about four times the swing angle of the mirror 10.

In this case also, it will easily be understood that the angle $\theta 3$ formed between the two beams LB1 and LB2 may be different from the scan angle $\theta 2$ of each of the beams from the reflecting surface 11 of the mirror 10. In that case also, it is obvious that the scan angle of the beams can be increased to be larger than twice the swing angle of the mirror 10.

Thus, in the present embodiment, the light source 50 is composed of the multiple light sources 50a and 50b such that the multiple beams LB1 and LB2 are emitted from the multiple light sources 50a and 50b to be incident at different angles on the reflecting surface 11 of the mirror 10.

Consequently, even when the reflecting surface 11 of the mirror 10 is composed of the single flat surface as in the prior art, the scanning range of the beams from the mirror 10 can be enlarged by a magnitude corresponding to the offset between the angles of the beams LB1 and LB2 at different angles of incidence, i.e., by the angle $\theta 3$ mentioned above.

Therefore, the present embodiment allows the scanning range of the beams from the mirror 10 to be enlarged without increasing the swing angle of the mirror 10 in the MEMS scanning apparatus.

As described above, in the present embodiment also, the angle $\theta 3$ formed between the two beams LB1 and LB2 at different angles of incidence is preferably the same as the scan angle $\theta 2$ of each of the beams from the reflecting surface 11 of the mirror 10.

The arrangement allows the two beams LB1 and LB2 to provide the scanning ranges with no gap and no overlapping portion therebetween via the mirror 10. As a result, the scanning range of the beams can be enlarged efficiently.

When the swing angle $=\theta 3/2=\theta 2/2=10°$ is assumedly satisfied, the scan angle $\theta 2$ of the beam resulting from the reflection of the beam LB1 from the first light source 50a and the scan angle $\theta 2$ of the beam resulting from the reflection of the beam LB2 from the second light source 50b have no overlapping portion and no gap therebetween. Accordingly, the total scan angle of the beams becomes $2 \times \theta 2$, as described above.

In the present embodiment also, the reflecting surface 11 of the mirror 10 may be comprised of the multiple mirror surfaces 11a and 11b at different angles.

Fourth Embodiment

Figure 6:
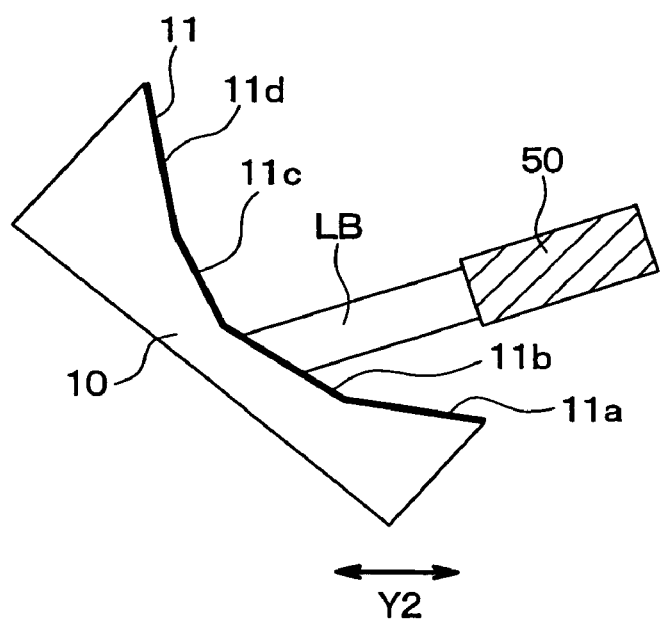
FIG. 6 is a schematic cross-sectional view showing the principal portion of an MEMS scanning apparatus according to a fourth embodiment of the present invention.

FIG. 6 is a schematic cross-sectional view showing the principal portion of an MEMS scanning apparatus according to a fourth embodiment of the present invention.

The scanning apparatus according to the present embodiment also comprises the mirror 10 (see FIG. 1) coupled to the base 20 via the beam portions 30 each as the spring portion and the light source 50 for emitting the beam LB toward the reflecting surface 11 of the mirror 10, in the same manner as in the first embodiment. The mirror 10 is designed to reflect the beam LB from the light source 50.

In the present embodiment, the mirror 10 is caused to linearly swing by the resilient force of the spring portion 30 when an electrostatic force is applied thereto. In other words, the scanning apparatus according to the present embodiment is basically designed as an MEMS and linearly swinging type.

In the present embodiment, the resilient force of the beam portions 30 (see FIG. 1) with which the mirror 10 is supported by the frame 21 allows the mirror 10 to linearly swing in the direction indicated by the arrow Y2 in FIG. 6.

As shown in FIG. 6, the present embodiment is characterized in that the reflecting surface 11 of the mirror 10 is comprised of multiple mirror surfaces 11a, 11b, 11c, and 11d at different angles in such a scanning apparatus.

In the example shown in FIG. 6, the reflecting surface 11 of the mirror 10 has a concave configuration. The reflecting surface 11 of the mirror 10 has the multiple mirror surfaces 11a to 11d at different angles formed in a stepwise configuration. In the present embodiment, the reflecting surface 11 of the mirror 10 may also have a convex configuration, though it is not depicted.

In the present embodiment, the beam LB is emitted from the light source 50 toward the reflecting surface 11 of the mirror 10 such that the beam LB is incident thereon and reflected thereby. At this time, since the mirror 10 linearly swings in the direction indicated by the arrow Y2 in FIG. 6, the beam LB reflected from the reflecting surface 11 performs a scanning operation in accordance with the swing of the mirror 10.

Thus, since the reflecting surface 11 of the mirror 10 includes the multiple mirror surfaces 11a to 11d at different angles, the scanning range of the beam can be enlarged by a magnitude corresponding to twice the offsets between the angles of the mirror surfaces 11a and 11d at different angles of the linearly swinging mirror 10.

Therefore, the present embodiment allows the scanning range of the beam from the mirror 10 to be enlarged without increasing the swing angle of the mirror 10 in the MEMS scanning apparatus.

Figure 7A:
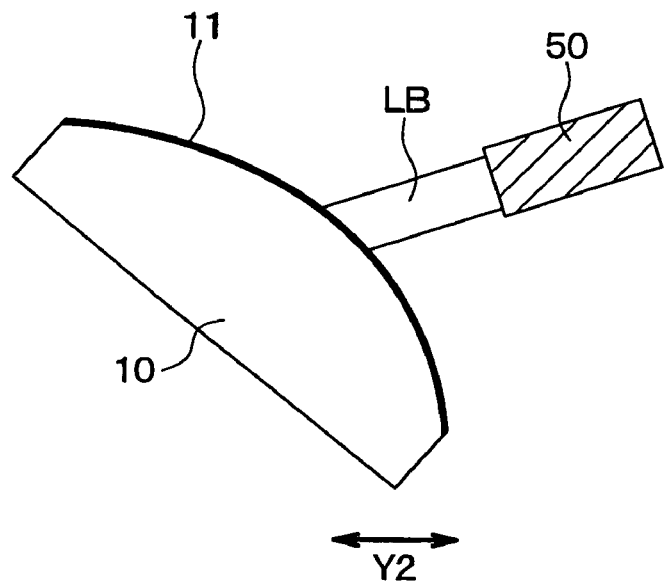
FIG. 7A, 7B are schematic cross-sectional views showing the principal portion of an MEMS scanning apparatus according to variations of the fourth embodiment.
Figure 7B:
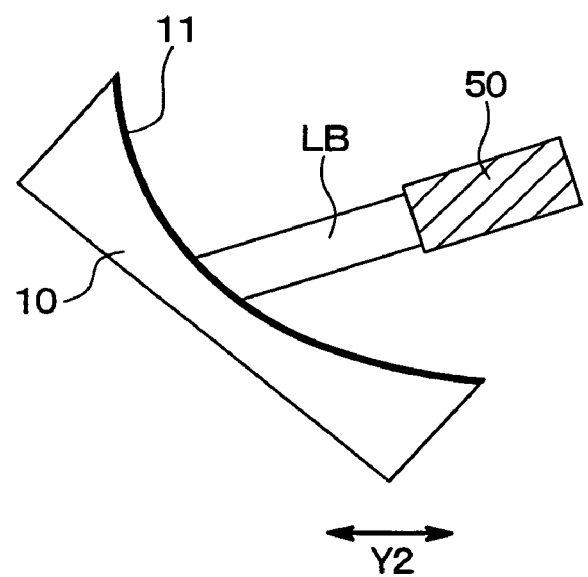

In the present embodiment, the reflecting surface 11 of the mirror 10 may also has the multiple mirror surfaces at different angles formed continuously, as shown in FIGS. 7A and 7B. FIG. 7A shows an example in which the multiple mirror surfaces at different angles are formed continuously in a convex configuration. FIG. 7B shows an example in which the multiple mirror surfaces at different angles are formed continuously in a concave configuration.

Fifth Embodiment

Figure 8A:
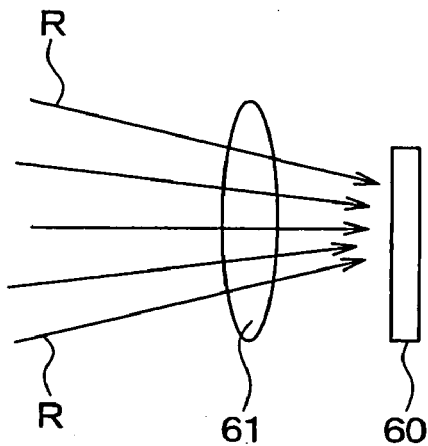
FIG. 8A is a schematic cross-sectional view showing the principal portion of an MEMS scanning apparatus according to a fifth embodiment of the present invention.
Figure 8B:
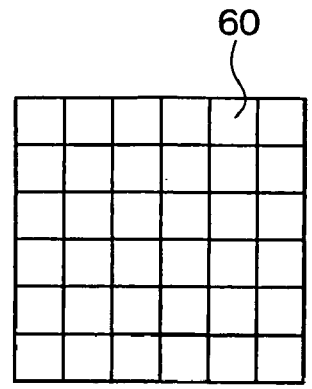
FIG. 8B is a schematic plan view of a light receiving portion in FIG. 8A.
Figure 9:
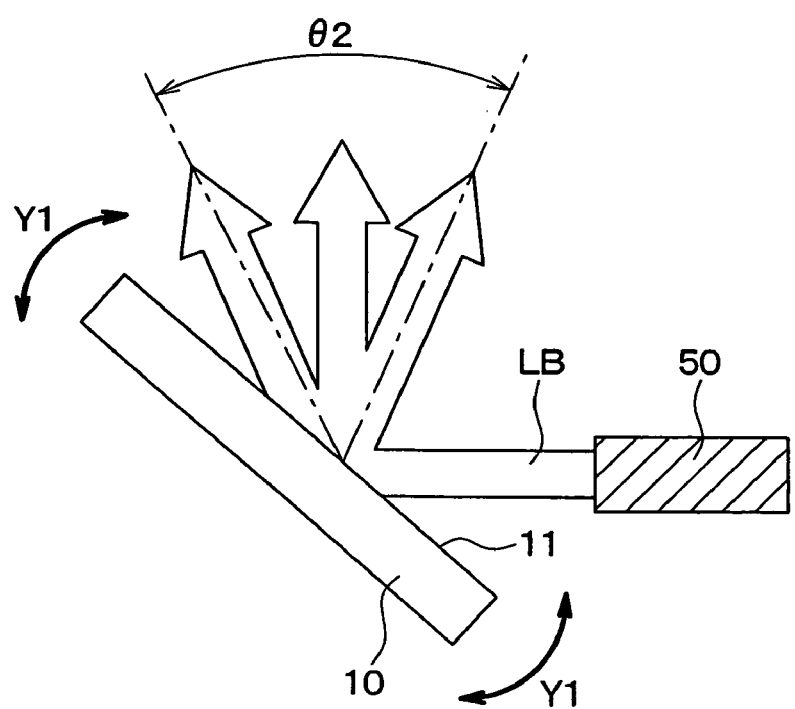
FIG. 9 is a schematic cross-sectional view of a prior-art MEMS scanning apparatus.

FIG. 8A is a schematic cross-sectional view showing the principal portion of an MEMS scanning apparatus according to a fifth embodiment of the present invention. FIG. 8B is a schematic plan view of a light receiving portion 60 in FIG. 8A.

The present embodiment is obtained by modifying the scanning apparatus described above in each of the foregoing embodiments such that multiple beams are emitted simultaneously from the mirror 10 and that the light receiving portion 60 is further provided to receive multiple reflected beams R when the multiple emitted beams impinge on an external object and are reflected thereby.

The multiple reflected beams R from the external object (not shown) are converged by a lens 61 for light reception and directed to the light receiving portion 60. As the light receiving portion 60, e.g., a photodiode or the like can be used.

As shown in FIG. 8B, the light receiving portion 60 has been divided into parts corresponding to the corresponding positions of the individual reflected beams R. In the depicted example, the light receiving portion 60 has been divided into a grid-like configuration. Accordingly, the directions of incidence of the reflected beams R that have been received can be determined based on the positions at which the reflected beams R were received in the light receiving portion 60.

Thus, in the scanning apparatus according to the present embodiment, the multiple beams are emitted simultaneously from the mirror 10 and the light receiving portion 60 is provided to receive the multiple reflected beams R generated when the multiple emitted beams impinge on the external object and are reflected thereby. In that case, by forming the light receiving portion 60 having a divided configuration, the multiple reflected beams R can be identified individually.

As a result, the scanning apparatus according to the present embodiment can be provided as a scanning apparatus suitable for use in a distance meter for measuring a distance from an external object or a laser radar.

Other Embodiments

In each of the embodiments described above, the semiconductor substrate 100 formed with the mirror 10, the light source 50, the light receiving portion 60, and the like can be incorporated into a case or the like to be formed and used as a unit.

The semiconductor substrate 100 composing the mirror 10 is not limited to the SOI substrate 100 described above. The beam portions 30 which exert a resilient force for causing the mirror 10 to rotationally or linearly swing is not limited to the configuration shown in FIG. 1. When necessary, the design of each of the semiconductor substrate 100 and the beam portions 30 could be modified by those skilled in the art.

Although the force applied to the mirror 10 to cause the mirror 10 to swing under the resilient force of the beam portions 30 each as the spring portion has been the electrostatic force in each of the embodiments described above, a force other than the electrostatic force, such as an electromagnetic force, may also be applied instead.

When necessary, the individual embodiments described above may also be used in combination within an allowable range.

It will be obvious to those skilled in the art that various changes may be made in the above-described embodiments of the present invention. However, the scope of the present invention should be determined by the following claims.

What is claimed is:

1. A scanning apparatus comprising:
   a mirror coupled to a base via a spring portion; and
   a light source for emitting a beam to be incident on a reflecting surface of the mirror, wherein:
   the mirror reflects the beam from the light source and rotationally swings under a resilient force of the spring portion when a force is applied thereto;
   the reflecting surface of the mirror includes a plurality of mirror surfaces at different angles to the beam from the light source; and
   the beam from the light source is simultaneously reflected by the mirror surfaces at different angles,
   wherein the beam from the light source is incident on an area including a boundary ridge line, which is formed between the mirror surfaces at different angles.

2. The scanning apparatus of claim 1, wherein the mirror is rotated such that the boundary ridge line between the mirror surfaces at different angles is an axis of rotation of the mirror.

3. The scanning apparatus of claim 1, wherein
   a pattern formed by the mirror surfaces at different angles is repeated over the reflecting surface of the mirror to thereby cause the mirror surface to have a saw-toothed surface.

4. The scanning apparatus of claim 1, wherein
   an angle formed between adjacent two of the mirror surfaces at different angles is half a scan angle of the beam reflected from each of the mirror surfaces.

5. The scanning apparatus of claim 1, further comprising:
   a light receiving portion for receiving a plurality of reflected beams, wherein:
   the reflected beams are generated when a plurality of beams that are reflected simultaneously from the mirror impinge on an external object and are reflected by the external object; and
   the light receiving portion is divided into parts corresponding to respective positions of the beams reflected by the external object so that directions of incidence of the beams reflected by the external object are determined based on the respective positions at which the beams reflected by the external object were received in the receiving portion, wherein a number of the parts into which the light receiving portion is divided is identical to a number of reflected beams.

6. A scanning apparatus comprising:

a mirror coupled to a base via a spring portion; and a plurality of light sources for emitting individual beams to be incident at different angles on a reflecting surface of the mirror, wherein the mirror reflects the beams from the light sources and rotationally swings under a resilient force of the spring portion when a force is applied thereto, wherein two beams at different angles of incidence are present and an angle formed between the two beams is identical to a scan angle of each of the beams reflected from the reflecting surface of the mirror.

7. The scanning apparatus of claim 6, further comprising:

a light receiving portion for receiving a plurality of reflected beams, wherein:

the reflected beams are generated when a plurality of beams that are reflected simultaneously from the mirror impinge on an external object and are reflected by the external object; and the light receiving portion is divided into parts corresponding to respective positions of the beams reflected by the external object so that directions of incidence of the beams reflected by the external object are determined based on the respective positions at which the beams reflected by the external object were received in the receiving portion, wherein a number of the parts into which the light receiving portion is divided is identical to a number of the plurality of reflected beams.

8. A scanning apparatus comprising:

a mirror coupled to a base via a spring portion at a predetermined angle with a horizontal plane; and a light source for emitting a beam toward a reflecting surface of the mirror, wherein:

the mirror reflects the beam from the light source while swinging in parallel with the horizontal plane and maintaining the predetermined angle under a resilient force of the spring portion when a force is applied thereto; and the reflecting surface of the mirror includes a plurality of mirror surfaces at different angles.

9. The scanning apparatus of claim 8, further comprising:

a light receiving portion for receiving a plurality of reflected beams, wherein:

the reflected beams are generated when a plurality of beams that are reflected simultaneously from the mirror impinge on an external object and are reflected by the external object; and the light receiving portion is divided into parts corresponding to respective positions of the beams reflected by the external object so that directions of incidence of the beams reflected by the external object are determined based on the respective positions at which the beams reflected by the external object were received in the receiving portion, wherein a number of the parts into which the light receiving portion is divided is identical to a number of the plurality of reflected beams.

* * * * *